United States Patent [19]
Severson et al.

[11] Patent Number: 5,378,067
[45] Date of Patent: Jan. 3, 1995

[54] NETWORK INTERFACE APPARATUS AND METHOD FOR REDUCING CONFLICTS THROUGH THE USE OF TIMES

[75] Inventors: Verne L. Severson; John D. Hardy, Jr., both of Chaska, Minn.

[73] Assignee: DataCard Corporation, Eden Prairie, Minn.

[21] Appl. No.: 126,682

[22] Filed: Sep. 24, 1993

Related U.S. Application Data

[63] Continuation of Ser. No. 651,726, Feb. 7, 1991, abandoned.

[51] Int. Cl.⁶ ...................... G06F 13/36; G06F 13/14
[52] U.S. Cl. .................................. 395/800; 395/325; 364/242.92; 364/260.1
[58] Field of Search ................. 395/800, 325

[56] References Cited

U.S. PATENT DOCUMENTS

| | | | |
|---|---|---|---|
| 4,345,250 | 8/1982 | Jacobsthal | 340/825.5 |
| 4,471,427 | 9/1984 | Harris | 395/275 |
| 4,471,481 | 9/1984 | Shaw et al. | 370/85 |
| 4,476,467 | 10/1984 | Terwilliger et al. | 340/825.5 |
| 4,493,021 | 1/1985 | Agrawal et al. | 364/DIG. 1 |
| 4,610,010 | 9/1986 | Claessen et al. | 370/32 |
| 4,644,348 | 2/1987 | Gerety | 340/825.06 |
| 4,670,872 | 6/1987 | Cordill | 370/85 |
| 4,706,082 | 11/1987 | Miesterfeld | 340/825.5 |
| 4,719,458 | 1/1988 | Miesterfeld | 340/825.5 |
| 4,807,223 | 2/1989 | Wells | 370/85 |

OTHER PUBLICATIONS

Stallings, William, *Data and Computer Communications,* pp. 290–297, copyrighted 1985.
*Data and Computer Communications;* by Stallings, pp. 344–363, copyrighted 1985.
Texas Instruments, Linear and Interface Circuits Applications, 1985, vol. 2, Section 9, pp. 2–5 and 40–41.

*Primary Examiner*—Alyssa H. Bowler
*Assistant Examiner*—John Harrity
*Attorney, Agent, or Firm*—Merchant, Gould, Smith, Edell, Welter & Schmidt

[57] ABSTRACT

A network interface circuit is interconnected to a network terminal to enable the network terminal to communicate with other network terminals on a local terminal network. The network interface circuit includes an RS-485 transceiver including a driver and transmitter function. A status timer 42 controls a status line back to the network so as to indicate to the network terminal when the network is in use. A driver timer is present to automatically enable the driver function of the RS-485 circuit when a start bit is received from the network terminal, the driver timer being designed to insure that RS-485 transmitter function remains active until all the data has been transmitted.

5 Claims, 3 Drawing Sheets

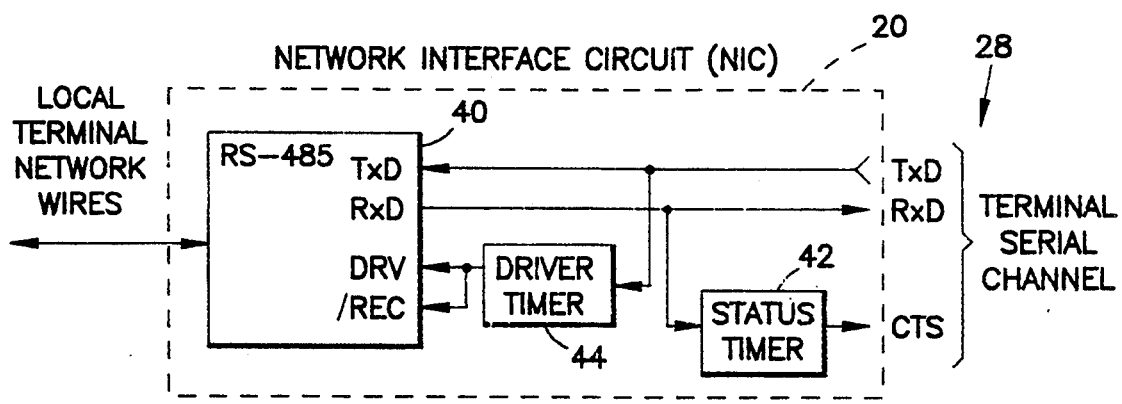
FIG. 1
FIG. 2
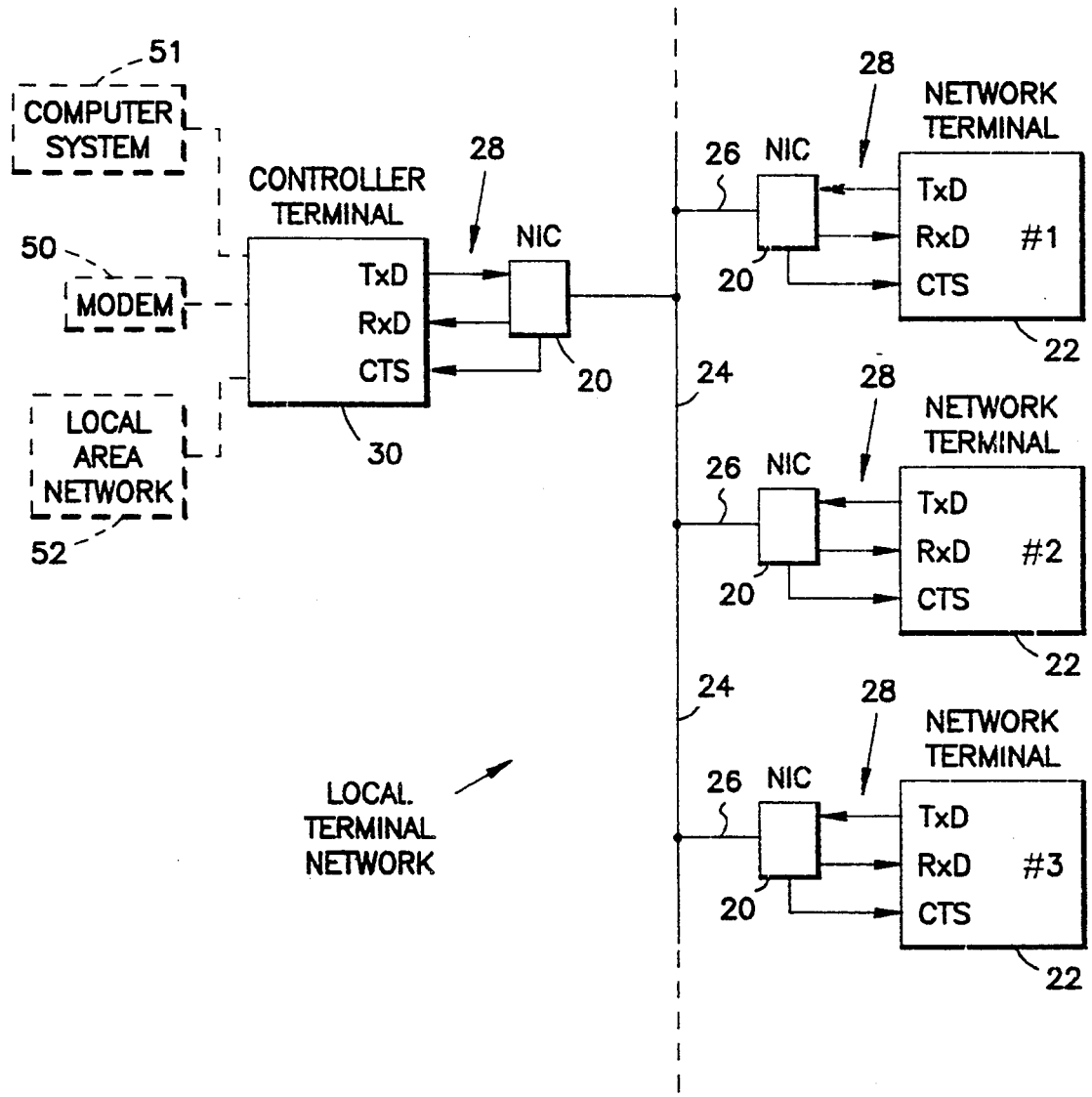

NETWORK INTERFACE APPARATUS AND METHOD FOR REDUCING CONFLICTS THROUGH THE USE OF TIMES

This is a continuation, of application Ser. No. 07/651,726, filed Feb. 7, 1991 now abandoned.

BACKGROUND OF THE INVENTION

The present invention relates to a network interface circuit apparatus and method.

Local Area Networks (LANs), also referred to as Local Terminal Networks, are used in a number of different applications. Many offices have terminals interconnected via a LAN to allow the transfer of files between terminals on the network, the transfer of electronic mail, the sharing of common resources such as memory devices, printers, modems, etc., the administration of terminals by a network administrator, accessing of common data bases, etc. Individual LANs are often connected to central host computer systems and/or additional LANs.

Numerous LAN standards have been developed to allow equipment from different vendors to be interconnected and communicate via the LAN. Each terminal on the network requires a transceiver function to allow transmission of information from the terminal to the network and receipt of information at the terminal from the network. One example of a LAN standard is the EIA RS-485 standard which utilizes an RS-485 transceiver. Two of the most common hardware implementations of RS-485 networks are to utilize a dedicated processor to control the RS-485 transceiver or to use the terminal itself to control the RS-485 transceiver.

A dedicated processor with read only memory (ROM), random access memory (RAM), and other logic provides a buffer between the terminal and the RS-485 transceiver circuit. The dedicated processor constantly watches the traffic on the network to know when the network is available for transmission of data on the network. When the dedicated processor receives blocks of data from the terminal, it will package the data with the appropriate protocol codes and append a check sum. It will then wait for the network to be available. When the dedicated processor senses that the network is available, the processor will transmit the data onto the network and wait for receipt of an acknowledgement (ACK) back from the receiving terminal. The dedicated processor will handle this transmission and any necessary retransmissions without requiring any further controller input from the terminal.

In this approach, each receiving terminal on the network will also have a dedicated processor that continually monitors the network line and waits for a message with its terminal address. Each processor on the network will have a unique address. The dedicated processor of the receiving terminal checks the received message for accuracy by checking the check sum or LRC and then responds with an acknowledgement (ACK) if the data is accurately received or a non-acknowledgement (NAK) if the data is not accurately received. Only when data is accurately received, does the dedicated processor send the data on to its associated terminal. The advantage of this approach is that there is very little network processing overhead required of the terminal since most of the network interface activity is carried out by the dedicated processor. The disadvantage of this approach is its relatively high cost. The dedicated processor section of the terminal is a significant cost as compared to the rest of the terminal electronics.

A second common hardware implementation of RS-485 networks is where the terminal processor controls the RS-485 transceiver. In this approach, the terminal's own processor handles all control of its interface to the network. The terminal must know when the network is available by inputting all data from the network at all times or at least try to input data when it has data to transmit. Once the terminal has verified that there is no traffic on the network, it must pause for a set period of time to ensure that the last transmitting terminal is off the line. It must then set a status bit to turn on the driver portion of its RS-485 transceiver. The RS-485 transceiver will then begin transmitting data. When the terminal has transmitted all of its data, it must then pause long enough for all the bits of the last byte to be shifted out the shift register before turning its RS-485 transceiver off.

The advantage of this approach is that it is very low cost since there is very little hardware required. The disadvantage of this approach is due to the terminal processor overhead required. The terminal processor must constantly input data from the network line to know when it is available and must implement delay timers to implement the delays previously described.

The present invention solves these and other problems associated with local area networks.

SUMMARY OF THE INVENTION

The present invention relates to a network interface circuit associated with a terminal on a network. The network interface circuit includes a transceiver for interfacing the terminal to the network, the transceiver including a driver for driving data onto the network. The network interface circuit further includes status means for providing network status information to the terminal processor indicating whether the network is active. The network interface circuit further includes an enabling means for automatically enabling the driver when data is received from the terminal processor.

In one embodiment of the present invention, the enabling means includes a driver timer for enabling the driver and continuing to hold the driver enabled until all bits of data have been transmitted.

In yet another embodiment of the present invention, the status means includes a status line (CTS) coupled to the terminal processor and a status timer for controlling the status line, the status line being made inactive when data is received by the statics timer indicating that data is being transmitted on the network.

In still another embodiment of the present invention, the network interface circuit includes retransmission delay means for delaying retransmission of data after a transmission by a first terminal processor simultaneously occurred with a transmission by a second terminal processor. In one embodiment, the delay time is determined randomly.

One advantage of the present invention is that the network driver, a standard RS-485 transceiver circuit in one embodiment of the present invention, is automatically enabled when the network terminal begins transmitting data. There is no requirement for the transmitting network terminal to control the network driver.

Another advantage of one embodiment of the present invention is that all network terminals receive a status indication via a status line (CTS) indicating when the network is idle. Before transmitting, the network terminals need only check the status line to determine when the network is available rather than waiting to see if it can input data from the network.

In a preferred embodiment, a status timer is built into the network interface circuitry to maintain the status line in an inactive state longer than any other network terminal's driver on the network. Therefore, software is not required at the terminal to provide a built in delay to insure that all other drivers are inactive.

The present invention also relates to a method for permitting transmission of data between a plurality of terminal processors of a communication network. The method includes providing a network interface circuit for interfacing each terminal processor to the network. The interface circuit includes a transceiver having a driver for driving the data onto the network, a status timer for controlling a status line coupled to the terminal processor, and a driver timer for controlling the driver. The method further comprises the step of checking the status line to determine if the network is active or inactive, the status line being made inactive when data is received by the status timer. The method further includes a step of automatically enabling the driver of the transceiver when data is received from the terminal processor by the driver timer and the status line is active.

An advantage of one embodiment of the present invention is that the network interface circuit of the present invention provides a very low cost network and one where the network terminal's processor is not excessively burdened with the network interfacing functions.

Still another advantage of one embodiment of the present invention is that the network interface circuit driver function is automatically enabled for a duration sufficient to insure that all bits of the last bit of data have been transmitted from the transmitting network terminal 22 to the receiving network terminal 22.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein like reference numerals generally indicate corresponding parts throughout the various views.

FIG. 1 is a block diagram of an embodiment of the network interface circuit in accordance with the principals of the present invention;

FIG. 2 a block diagram illustrating terminals on a network implementing the network interface circuitry shown in FIG. 1;

DETAILED DESCRIPTION OF A PREFERRED EMBODIMENT OF THE PRESENT INVENTION

Figure 3:
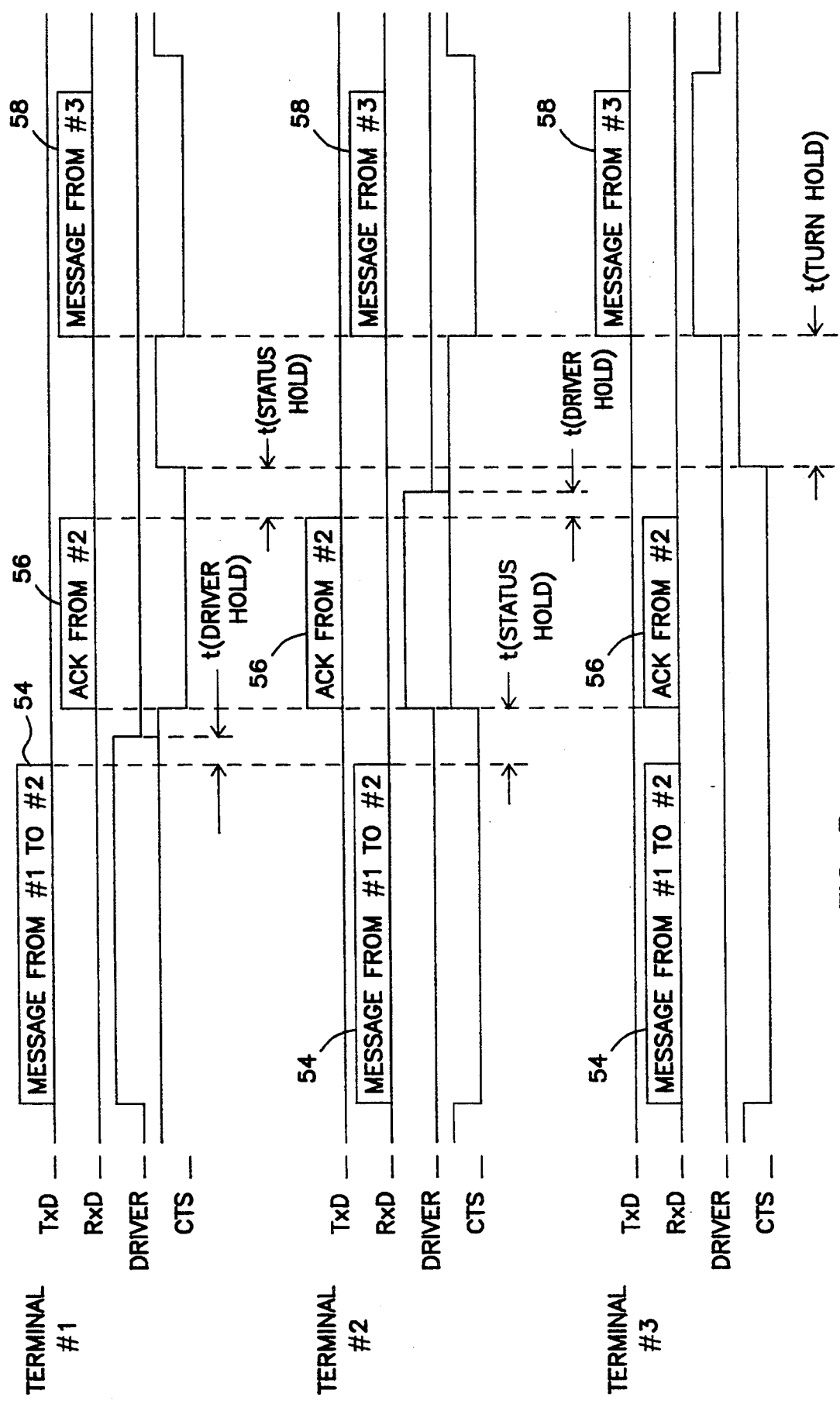
FIG. 3 is a timing diagram of the embodiment of the network interface circuit shown in FIG. 1.
Figure 4:
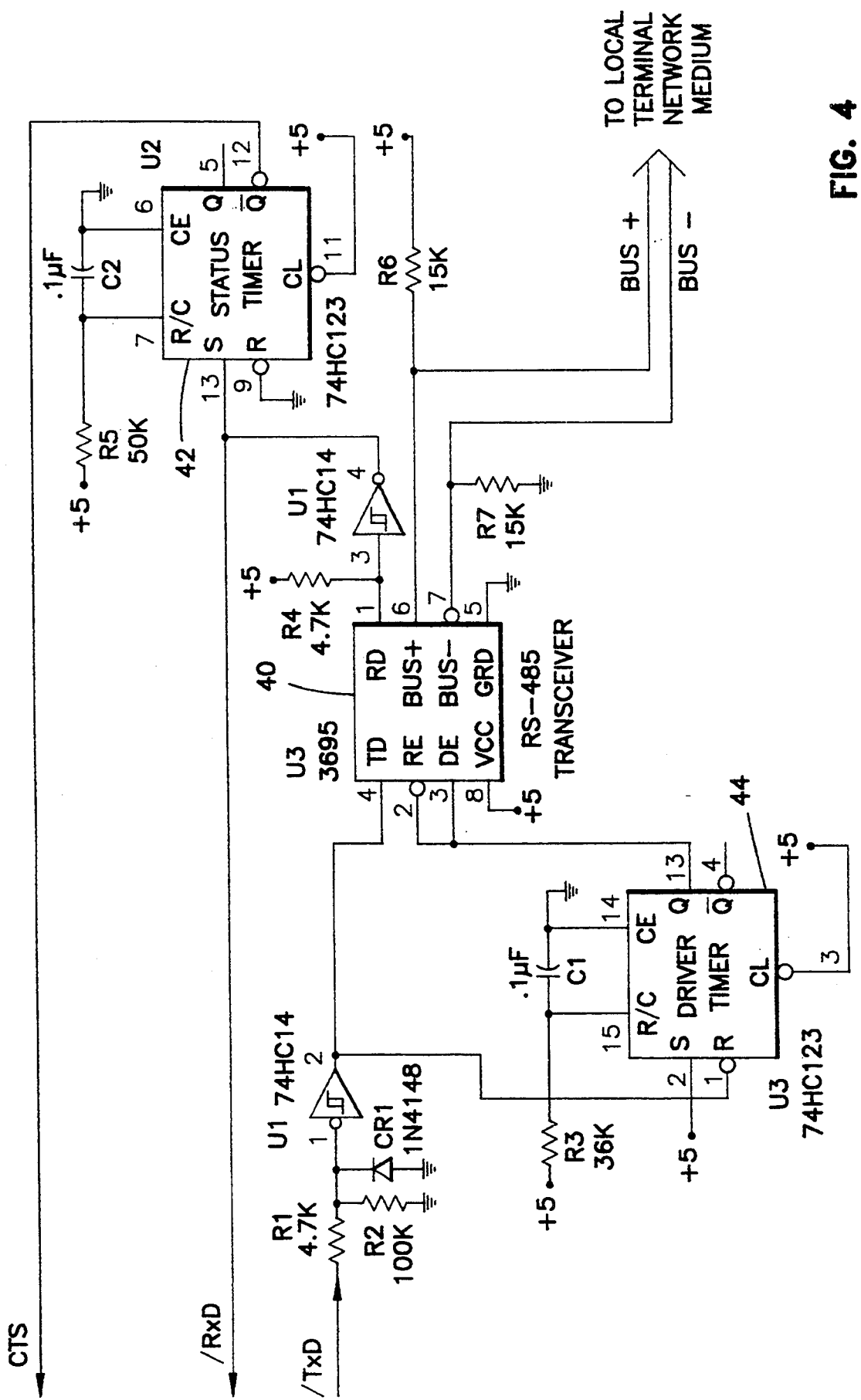
FIG. 4 is a schematic diagram of the network interface circuit shown in FIG. 1.

Referring now to FIG. 1, there is illustrated a preferred embodiment of a network interface circuit (NIC) in accordance with the principles of the present invention, the network interface circuit being generally referenced by the reference numeral 20. As further illustrated in FIG. 2, the network interface circuit 20 interconnects network terminals 22 to a local terminal network medium 24 of a local terminal network. The local terminal network medium 24 might include RS-485 single twisted pair wire as its physical transmission media although other media might be used. The network interface circuit 20 is illustrated interconnected to the network terminal medium 24 by suitable electric connectors 26 and is further interconnected to the network terminal 22 by a terminal serial channel 28. It will be appreciated that a plurality of network terminals 22 might be interconnected to the local terminal network medium 24. In one embodiment of the present invention, up to 32 network terminals can be so interconnected by their corresponding network interface circuits 20.

Referring new back to FIG. 1, the network interface circuit 20 is shown utilizing a standard RS-485 transceiver circuit 40 to interface a network terminal serial channel to the local area network.

The network interface circuit 20 uses standard hardware specified by the EIA RS-485 standard. Each of the network terminals 22 on the network, has one of the RS-485 transceivers 40, which is an integrated circuit chip, connected to one of its serial channels. The RS-485 transceiver 40 includes a transmitter and receiver function. The transmitter and receiver are both connected to the twisted pair wire of the local terminal network medium 24.

The network interface circuit 20 further includes two timers. One timer, a status timer 42, controls the clear-to-send (CTS) status line back to the network terminal 22. The status timer 42 causes the CTS status line to go inactive when data is received from the RS-485 transceiver circuit 40 which indicates that there is traffic on the network. A delay t(STATUS HOLD) is built into the status timer 42 to keep the CTS status line inactive for a short time longer than the worst case duration of any driver on the network which might be active. Holding the CTS status line inactive for this amount of time insures that the network terminal 22 will not attempt to send while any other network terminal 22 or other driver on the local area network 24 is still active.

The second timer is a driver timer 44. The driver timer 44 causes the RS-485 transceiver circuit to drive the network line 24 when a start bit is received from the network terminal 22. Each successive start bit or "zero" level bit restarts the driver timer 44. The driver timer has been set to insure that the RS-485 transceiver circuit 40 transmitter function remains active until all data, including all bits of the last character have been transmitted to a receiving network terminal 22.

When a network terminal 22 wants to transmit, the network terminal 22 checks the CTS status line. If the CTS status line is active, the network terminal 22 can transmit its data to the network interface circuit 20. If the CTS status line is a hardware enable into the network terminal's universal asynchronous receiver/transmitter (UART), the network terminal 22 needs to only load the UART with data. The data will then automatically be transmitted by the UART when the CTS status line is active. The network terminal 22 does not have to switch the RS-485 transceiver circuit driver on and off, as this is done automatically within the network interface circuit 20.

Data is transmitted from one network terminal 22 to another network terminal 22 by uniquely addressing the data to the receiving terminal, each terminal having a unique address. Accordingly, all receiving network terminals 22 must continuously monitor the network for data to see if the data being transmitted on the network includes its address and therefore is intended for receipt by it. However, the network terminal 22 which transmits the data does not need to monitor the data transmission. Indeed, the network terminal 22 may not be able to monitor the data if, in fact, it is inputting data from a keyboard or magnetic stripe card reader such as which might be present in a point of sale (POS) terminal. When the network terminal 22 has data to transmit, it needs to only check the CTS status line to see if the network is available. If the network is available, the data is transmitted across the serial interface data lines (T×D) to the network interface circuit 20. In turn, data is received from the network interface circuit 20 across the serial interface data lines (R×D).

It will be appreciated that the network interface circuit 20 might be integrated within a network terminal 22 such as on a daughter board or expansion card, or might even be positioned on the mother board itself. In yet other implementations, the network interface circuit 20 might be disposed within an external box which is interconnected to a standard RS-232 serial port of the network terminal 22.

In use, the network terminals 22 will normally have their receivers enabled. When one of the network terminals 22 is ready to transmit data on the network line 24, it will enable its transmitter and keep it enabled until all the data is sent. To avoid colliding with another network terminal's data, the network terminal 22 which is going to transmit data must first check the network line 24 to see if it is idle before enabling its transmitter.

In the preferred embodiment, each message that is transmitted includes the destination address of the receiving network terminal 22, as well as the source network terminal 22 address. A check sum LRC character is appended to the end of the message. All network terminals 22 continuously monitor all messages on the network. When a network terminal 22 recognizes its terminal address in the message, it inputs the message and verifies its accuracy by checking the check sum or LRC character. If the message is accurately received, it sends an acknowledgment (ACK) message back to the transmitting terminal. If the message was received with a check sum or LRC error, a non-acknowledgment (NAK) message is transmitted. When the transmitting terminal receives a non-acknowledgment message, it will attempt to retransmit the message.

It is possible for two terminals to begin transmitting at the same time. If this happens, the two terminals will not get their messages acknowledged since the check sum or LRC will not be correct. The two network terminals 22 will then have to retry their transmissions. The controlling software of each of the network terminals 22 preferably has a retransmission delay mechanism, such as a built-in random delay, that insures that the two network terminals 22 will not attempt a simultaneous retransmission.

As illustrated in FIG. 2, one of the network terminals is a network controller terminal 30. The network controller terminal 30 might be utilized to interconnect the network terminals 22 of the local terminal network to a telephone line via a modem 50 such as when access to a remote host is required. In addition, the network controller terminal 30 might be utilized to interconnect the local terminal network to other local area or local terminal networks 52. The network controller 30 might also be used to log data in memory and/or on suitable memory storage devices. In addition, the controller terminal 30 might be interconnected to a computer system 51 to enable transfer of information between the computer system and the controller terminal 30. While in the preferred embodiment, it is intended that one of the network terminals be designated as the controller network terminal 30, any network terminal 22, within the network, can initiate communication with any other network terminal 22, within the network.

Referring now to FIG. 3, a general description of the network protocol and timing will now be described. By way of example, Terminal #3 in FIG. 3 is the transmitting terminal and Terminal #2 is FIG. 3 is the destination terminal. Once transmission from Terminal #1 to Terminal #2 is complete, FIG. 3 shows Terminal #3 transmitting a message.

A network terminal 22 initiates a network transmission by sending the following data which is generally referenced by the message box 5 in FIG. 3:

a start transmission command (STX), destination and transmitting network terminal adresses, data, end-of-transmission command (ETX), and LRC.

The destination network terminal 22, upon recognizing its address, will receive the data and respond with the following acknowledged message generally referenced by the acknowledge block 56, in FIG. 3:

acknowledge (ACK), destination and transmitting network terminal addresses, end-of-transmission command (ETX), LRC.

The initiating network terminal 22 verifies receipt of this acknowledged message. If the initiating network terminal 22 receives no acknowledged message within a specified period of time, it will retry the transmission. The initiating terminal will wait a period of time before retrying the transmission based on a random number, so as to reduce the probability of a further collision. In other embodiments, the initiating terminal 22, might wait a specified period of time based on its address. In this embodiment, there are types of terminals which might be assigned different delay periods or each terminal might have a unique delay period. It will be appreciated that other delay schemes might be used. As illustrated in the timing diagram of FIG. 3, the RS-485 circuit 40 driver function is held active by the driver timer 44 of the initiating terminal so as to continue driving the network line 24 for a period of time t(DRIVER HOLD) beyond the message transmission. In some embodiments, this period of time t(DRIVER HOLD) might range from 1.2 milliseconds to 2.7 milliseconds for transmission rates of 9600 bits per second (bts) and above. This time starts from the end of the last start bit or the end of the last "zero" bit transmitted in the message. The timing is baud rate dependent. The time must be long enough for a character that had no "zero" level bits, other than the start bit, to keep the driver active.

The CTS status line back to the destination network terminal 22 is held inactive due to activity on the network medium 24. This time represented by t(STATUS HOLD) is baud rate dependent and, in some embodiments, varies from 2.8 milliseconds to 5.8 milliseconds for 9600 bts and above. The status timer 42 is set so that the minimum t(STATUS HOLD) time will always be longer than the maximum t(DRIVER HOLD) time to ensure that the two transmitters never drive the line simultaneously.

In the preferred embodiment, an additional software delay t(TURN HOLD) is programmed into the software of each network terminal. The t(TURN HOLD) time is the estimated time that it takes for the receiving network terminal to generate its acknowledge message. If other network terminals delay this amount before transmitting their messages, the probability of inserting traffic between a message and its acknowledge message can be reduced.

The transmitter driver of the RS-485 transceiver 40 is held active by the driver timer 44 which is started by the start bit in the character being transmitted. The driver timer 44 is held active by succeeding start "zero" bits. Since it is possible to send a character with a start bit and no "zero" bits, this delay must have a minimum value equal to one full character time. Character time on a 9600 bts transmission rate network is calculated as follows: 0.104 milliseconds times 11 bits equals 1.144 milliseconds. In the preferred embodiment, components are chosen that provide a nominal delay of 1.99 milliseconds. Since the total tolerance of components is 36%, the actual delay range is 1.27 milliseconds to 2.70 milliseconds.

The status timer 42 is started by the start bit of a character being received at the receiving network terminal 22 and it is restarted by any following start bit or "zero" bit. The minimum value of this delay must be greater than the maximum expected delay of the timer controlling any transmitter driver on the network to insure that the two drivers are never simultaneously active. Since the maximum drive time in the preferred embodiment calculated above for the transmitter driver is 2.70 milliseconds, the status timer component should be chosen to provide a delay of 4.28 milliseconds. Given a 36% tolerance of components, the actual delay range would then be 2.74 milliseconds to 5.82 milliseconds.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. In a communications network for transmitting data on a communication medium coupling a plurality of terminal processors, a network interface circuit associated with each terminal processor comprising:

a transceiver for interfacing said terminal processor to said network, said transceiver including a driver for driving data on said communication medium, said driver continuing to drive the communication medium for a period of time, t(DRIVER HOLD), beyond the time data is transmitted;

status means for providing status information to said terminal processor indicating whether data is being transmitted on said communication medium, said status means further comprising a status line coupled to said terminal processors, wherein said status line is made inactive when data is transmitted on said communication medium, and is made active when no data is transmitted on said communication medium, said status line being held inactive for a period of time, t(STATUS HOLD), beyond the time data is transmitted, t(STATUS HOLD) being greater than t(DRIVER) to ensure that a transmitting terminal processor and a receiving terminal processor never drive the communication medium at the same time, said terminal processor means including further delay means for delaying transmission of data a period of time, t(TURN HOLD), after said status line becomes active so as to ensure that a receiving terminal processor can send an acknowledge data message to a transmitting terminal processor;

enabling means for automatically enabling said driver upon initiation of data transfer from said terminal processor to the network interface circuit; and wherein said enabling means includes a driver timer for automatically enabling said driver and continuing to hold said driver enabled until all bits of said data have been transmitted, said enabling means disabling said driver once all bits of said data have been transmitted, said terminal processor re-initiating transfer of the data to the network interface circuit card if an acknowledgment message is not received within a defined time-out period, whereby said enabling means will again automatically enable said driver and continue to hold said driver enabled until all bits of said data have been transmitted, said terminal processor including retransmission delay means for delaying re-initiating transfer of the data so that multiple terminal processors do not retransmit data at the same time.

2. A network interface circuit according to claim 1, said retransmission delay time determined randomly.

3. A network interface circuit according to claim 1, said retransmission delay time determined by an address of the terminal processor.

4. A method for permitting transmission of data between a plurality of terminal processors on a communication medium of a communication network, comprising the steps of:

providing a network interface circuit for electrically interfacing each terminal processor to said network, said interface circuit including a transceiver having a driver for driving said data on said communication medium, a status timer for controlling a status line coupled to said terminal processor, and a driver timer for controlling said driver;

checking said status line to determine if said communication medium is active or inactive, said status line made inactive when data is detected by said status timer;

automatically enabling said driver of said transceiver when data is received from said terminal processor by said driver timer and said status line is active;

continuing to hold said driver enabled until all bits of said data have been transmitted, continuing to drive the communication medium for a period of time, t.(DRIVER HOLD), beyond the time data is transmitted, holding said status line inactive for a period of time, t(STATUS HOLD), beyond the time data is transmitted, t(STATUS HOLD) being greater than t(DRIVER) to ensure that a transmitting terminal processor and a receiving terminal processor never drive the communication medium at the same time, delaying transmission of data by a terminal processor a period of time, t(TURN HOLD), after said status line becomes active so as to ensure that a receiving terminal processor can send an acknowledge data message to a transmitting terminal processor; and retransmitting said data if an acknowledgment message is not received within a defined time-out period, delaying re-transmission of said data so that multiple terminal processors do not retransmit data at the same time.

5. A method in accordance with claim 4, including the step of further delaying said terminal processor from transmitting data after said status line becomes active so as to allow a receiving terminal to generate an acknowledge data message after having received data.

* * * * *